(12) United States Patent
Nagata et al.

(10) Patent No.: US 7,698,168 B2
(45) Date of Patent: Apr. 13, 2010

(54) PRODUCT SALES SYSTEM

(75) Inventors: Watari Nagata, Tokyo (JP); Hiroshi Kanamori, Kanagawa (JP); Toshiaki Iwahori, Kanagawa (JP); Toshio Tsuneda, Osaka (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 10/447,974

(22) Filed: May 30, 2003

(65) Prior Publication Data
US 2004/0015402 A1  Jan. 22, 2004

(30) Foreign Application Priority Data
Jun. 18, 2002  (JP)  ............... 2002-176887

(51) Int. Cl.
*G06Q 30/00* (2006.01)
(52) U.S. Cl. .......................... 705/26; 705/37
(58) Field of Classification Search ........... 705/226–27, 705/26, 37
See application file for complete search history.

(56) References Cited

U.S. PATENT DOCUMENTS

2002/0099691 A1* 7/2002 Lore et al. .................. 707/2

2003/0050855 A1* 3/2003 Jaffe et al. .................. 705/26

OTHER PUBLICATIONS

Lowson, Robert, Retail operational strategies in complex supply chains, International Journal of Logistics Management. Ponte Vedra Beach: 2001. vol. 12, Iss. 1; p. 97, downloaded from ProQuest Direct on the Internet on Nov. 8, 2009, 18 pages.*

* cited by examiner

*Primary Examiner*—James Zurita
(74) *Attorney, Agent, or Firm*—Oblon, Spivak, McClelland, Maier & Neustadt, L.L.P.

(57) ABSTRACT

Regardless of whether specific products are individual products or element products, the specific products are managed by the same product code while element products are associated and handled as a group of products. A product selection server presents the element products by associating them with one another for each group of products. A user terminal allocates a unique purchase group number for each group of products to element products in purchase-requested product data. The product selection server receives the purchase-requested product data and indicates a price as a group of products based on the purchase group number. An order entry server searches an incorrect from the purchase-requested product data based on the purchase group number. A factory terminal and a distribution terminal issue business forms based on the purchase group number.

23 Claims, 14 Drawing Sheets

| PRODUCT CODE | PRODUCT NAME | MAIN BODY FLAG | PRICE INDICATION FLAG | SINGLE PRODUCT PRICE | PRICE IN GROUP |
|---|---|---|---|---|---|
| CPA | COMPUTER A | 1 | | 198,000 | 198,000 |
| CPB | COMPUTER B | 1 | | 298,000 | 298,000 |
| MM | MEMORY | | | 3,180 | 3,180 |
| HD | HARD DISK DRIVE | | | 39,800 | 39,800 |
| DP | DISPLAY | | 1 | 148,000 | 128,000 |
| FD | FLEXIBLE DISK DRIVE | | | 12,800 | 12,800 |
| CD | CDR DRIVE | | | 25,800 | 25,800 |

| 191 | 192 | 193 | 194 | 195 | 196 | 197 |
|---|---|---|---|---|---|---|
| PRODUCT CODE | PRODUCT NAME | MAIN BODY FLAG | GROUP PRODUCT CODE | PRICE INDICATION FLAG | SINGLE PRODUCT PRICE | PRICE IN GROUP |
| CPA | COMPUTER A | 1 | MM,HD,DP,CD | | 198,000 | 198,000 |
| CPB | COMPUTER B | 1 | MM,HD,DP | | 298,000 | 298,000 |
| MM | MEMORY | | | | 3,180 | 3,180 |
| HD | HARD DISK DRIVE | | | | 39,800 | 39,800 |
| DP | DISPLAY | | | 1 | 148,000 | 128,000 |
| FD | FLEXIBLE DISK DRIVE | | | | 12,800 | 12,800 |
| CD | CDR DRIVE | | | | 25,800 | 25,800 |

FIG.6

| PRODUCT CODE (191) | PRODUCT NAME (192) | MAIN BODY FLAG (193) | PRICE INDICATION FLAG (195) | SINGLE PRODUCT PRICE (196) | PRICE IN GROUP (197) |
|---|---|---|---|---|---|
| CPA | COMPUTER A | 1 | | 198,000 | 198,000 |
| CPB | COMPUTER B | 1 | | 298,000 | 298,000 |
| MM | MEMORY | | | 3,180 | 3,180 |
| HD | HARD DISK DRIVE | | | 39,800 | 39,800 |
| DP | DISPLAY | | 1 | 148,000 | 128,000 |
| FD | FLEXIBLE DISK DRIVE | | | 12,800 | 12,800 |
| CD | CDR DRIVE | | | 25,800 | 25,800 |

FIG.7

| SET CODE (198) | NAME OF SET (199) | GROUP PRODUCT CODE (194) |
|---|---|---|
| CPA | COMPUTER SET A | MM,HD,DP,CD |
| CPB | COMPUTER SET B | MM,HD,DP |

FIG.8

| | |
|---|---|
| 401 | 402 |
| COMPUTER A'S MAIN BODY | 1 |
| MEMORY | 1 |
| HARD DISK DRIVE | 1 |
| DISPLAY | 1 |
| CDR DRIVE | 0 |
| COMPUTER B'S MAIN BODY | 1 |
| MEMORY | 1 |
| HARD DISK DRIVE | 0 |
| DISPLAY | 1 |
| MEMORY | 2 |
| HARD DISK DRIVE | 0 |
| DISPLAY | 0 |
| FLEXIBLE DISK DRIVE | 1 |
| CDR DRIVE | 0 |

SUB-TOTAL :　¥817,320
　　　　　　　　　403

404　ADD TO BASKET

FIG.9

| | | |
|---|---|---|
| #4000 | 1 | ( COMPUTER A'S MAIN BODY ) |
| #4001 | 1 | ( MEMORY ) |
| #4002 | 1 | ( HARD DISK DRIVE ) |
| #4003 | 1 | ( DISPLAY ) |
| #4004 | 0 | ( CDR DRIVE ) |
| #4005 | 1 | ( COMPUTER B'S MAIN BODY ) |
| #4006 | 1 | ( MEMORY ) |
| #4007 | 0 | ( HARD DISK DRIVE ) |
| #4008 | 1 | ( DISPLAY ) |
| #4009 | 2 | ( MEMORY ) |
| #400A | 0 | ( HARD DISK DRIVE ) |
| #400B | 0 | ( DISPLAY ) |
| #400C | 1 | ( FLEXIBLE DISK DRIVE ) |
| #400D | 0 | ( CDR DRIVE ) |

441

| | |
|---|---|
| #8000 | #4004 |
| #8001 | #4008 |
| #8002 | null |

| PRODUCT CODE | AMOUNT OF PURCHASE | PURCHASE GROUP NUMBER | MAIN BODY FLAG |
|---|---|---|---|
| CPA | 1 | 1 | 1 |
| MM | 1 | 1 | |
| HD | 1 | 1 | |
| DP | 1 | 1 | |
| CPB | 1 | 2 | 1 |
| MM | 1 | 2 | |
| DP | 1 | 2 | |
| MM | 2 | 3 | |
| FD | 1 | 4 | |

FIG.11

| 421<br>PRODUCT NAME | 422<br>UNIT PRICE | 423<br>QUANTITY | 424<br>SUB-TOTAL<br>FOR PRODUCT | 425<br>TARGET<br>DELIVERY DATE |
|---|---|---|---|---|
| COMPUTER A | ¥240,980 | 1 | ¥368,980 | MIDDLE OF JULY |
| MEMORY | | | | |
| HARD DISK DRIVE | | | | |
| DISPLAY | ¥128,000 | | | |
| COMPUTER B | ¥301,180 | 1 | ¥429,180 | LATE JULY |
| MEMORY | | | | |
| DISPLAY | ¥128,000 | | | |
| MEMORY | ¥31,80 | 2 | ¥6,360 | EARLY JULY |
| FLEXIBLE DISK DRIVE | ¥12,800 | 1 | ¥12,800 | EARLY JULY |

TOTAL (TAX EXCLUDED): ¥817,320 — 426

AMOUNT OF TAX: ¥40866 — 427

TOTAL: ¥358,186 — 428

420 — ( RETURN TO PRODUCT SELECTION )

429 — ( ORDER )

FIG.12

| PRODUCT CODE 501 | PRODUCT NAME 502 | AMOUNT OF PURCHASE 503 | PURCHASE GROUP NUMBER 504 |
|---|---|---|---|
| CPA | COMPUTER A | 1 | 1 |
| MM | MEMORY | 1 | 1 |
| HD | HARD DISK DRIVE | 1 | 1 |
| DP | DISPLAY | 1 | 1 |
| CPB | COMPUTER B | 1 | 2 |
| MM | MEMORY | 1 | 2 |
| DP | DISPLAY | 1 | 2 |
| MM | MEMORY | 2 | 3 |
| FD | FLEXIBLE DISK DRIVE | 1 | 4 |

PRODUCT SALES SYSTEM

CROSS REFERENCE TO RELATED APPLICATIONS

The present document is based on Japanese Priority Application JP2002-176887, filed in the Japanese Patent Office on Jun. 18, 2002, the contents of which being incorporated herein by reference to the extent permitted by law.

BACKGROUND OF THE INVENTION

1. Field of the Invention

The present invention relates to a product sales system, a product sales apparatus, a product selection server, an order entry server, a user terminal, a method of requesting selection of product, a method of performing order entry, a method of selecting a product and a computer program for implementing the methods and a recording medium thereof, in particular to a system, an apparatus, a method, a computer program or a recording medium suitable for a product sales system in which a desired product may be added to a virtual shopping basket. A product as mentioned in this specification shall be taken in order to widely cover not only a tangible product but also intangible matters such as services and the like.

2. Description of Related Art

In conventional technologies, when selling a product (hereinafter referred to as specific product) which may be sold as an independent single product (hereinafter referred to as individual product) or also as a product included in a group of products (hereinafter referred to as element product) composed of a plurality of products (hereinafter referred to as group of products), the individual product and the element product are managed by having allocated respectively different product codes. As an example of specific product, when a memory module sold as an individual product is sold as an element product of a computer set of a group of products, the product number for the element product is allocated independent from the product number for the individual product.

SUMMARY OF THE INVENTION

According to the conventional technique described above, for example, if there are only five kinds of memory modules in terms of capacity and five kinds of computer sets, 25 product numbers should be allocated. Thus, as the number of products increases, a large amount of product numbers is required.

In addition, in a factory, a distribution center, a store, etc. where element products are combined into a group of products, different product numbers allocated to the same specific product may become confusing.

The present invention has been conceived in order to alleviate such problems by managing a specific product in such a way that an identical product number or code is allocated or allocated to the specific product regardless of whether it is an individual product or an element product and to handle the element product by association with a group of products.

According to a preferred embodiment of the present invention, there is provided a product sales system including a product database for holding a product list including specific products as products which are sold as individual products or element products included in a group of products; a product selection server for presenting product presentation data associating the element products with one another for each of the group of products according to the product list held in the product database and prompting selection of a product, and for receiving purchase-requested product data in which the element products have a unique identifier provided for each of the group of products; an order database for holding an order status for each product; and an order entry server for updating the order database based on the purchase-requested product data received by the product selection server, thus a user terminal may have a unique identifier allocated to the element product for each group of products.

In addition, the product sales system may further include at least a user terminal for outputting to the product selection server, the element product with the unique identifier for each of group of products as the purchase-requested product data, in response to presentation of the product presentation data. As a result, a function is provided which associates element products with each group of products.

A product selection server according to a preferred embodiment of the present invention includes a means for associating element products with one another and preparing a product presentation data for each group of products, based on a product list including specific products as products which are sold as the individual products or the element products included in the group of products; a means for prompting selection of a product by presenting the product presentation data; and a means for receiving a purchase-requested product data in which the element products have a unique identifier provided for each of the group of products. As a result, a user terminal may have a unique identifier allocated to the element product for each group of products In addition, the product selection server may have the means for prompting selection of the product presenting the specific products as the element products included in the group of products and as the individual products. As a result, a function is provided in which a specific product can be regarded as both an element product and an individual product, while management is done through a same product code.

Still, the product selection server may have the product list including product prices of each product, and the means for prompting selection of the product indicating the product prices when presenting the specific products as the individual products and not indicating the product prices when presenting the specific products as the element products included in the group of products. As a result, a function is provided in which the product price as a group of products may be presented to the purchaser without showing the price as an element product.

Moreover, the product selection server may have the product list including product prices of respective products and including an instruction means for each of the products for instructing whether to indicate the product prices when presented as the element products included in the group of products; and the means for prompting selection of the product indicating the product prices when presenting the specific products as the individual products, and not indicating the product prices if the instruction means does not instruct to indicate the product prices or indicates the product prices if the instruction means instructs to indicate the product prices when presenting the specific products as the element products included in the group of products. As a result, a function is provided in which it is possible to control the display of price according to the content of the instruction means.

Furthermore, the product selection server may have the product list including single product prices when respective specific products are treated as the individual products and prices within the group when the specific products are treated as the element products included in the group of products; and the means for prompting selection of the product calculating the single product prices of the specific products when presenting the specific products as the individual products and calculating the prices within the group of the specific products when presenting the specific products as the element products included in the group of products to then display a total amount.

The product selection server according to the preferred embodiment of the present invention may further include means for searching a product from the product list that matches a search condition, the means for associating the element products with one another for each of the group of products according to the product searched by the means for searching.

The product selection server according to the preferred embodiment of the present invention may further have the unique identifier allocated to each of the group of products including a character, and the product selection server further including means for performing a correction process for making the identifier of the received purchase-requested product data match a condition. As a result, the identifier is conformed to the subsequent process.

According to another preferred embodiment of the present invention, there is provided an order entry server including means for receiving purchase-requested product data including specific products sold as individual products or as element products included in a group of products, the element products having a unique identifier provided for each of the group of products; and a means for updating an order status of each product based on the purchase-requested product data. As a result a function is provided in which order is processed by associating the element product with each group of products.

In addition, the order entry server may further include a means for verifying whether there is data in the purchase-requested product data that does not satisfy a condition for the group of products; and means for indicating existence of data that does not satisfy the condition.

Also, the order entry server may have the condition defined by a relationship between a purchase quantity of a main body of the group of products and a purchase quantity of the element products other than the main body. As a result, a means for indicating existence of data that does not satisfy the condition is provided.

Moreover, the order entry server may have the condition requiring that the purchase quantity of the main body of the group of products be equal to or larger than the purchase quantity of the element products other than the main body. As a result, a means for indicating existence of data that does not satisfy the condition is provided.

Furthermore, the order entry server may further include a means for outputting ordered items in which the element products have a unique identifier provided for each of the group of products according to the purchase-requested product data. As a result, a function is provided in which the element product is associated to each group of products for subsequent process.

Still, the order entry server according may further include a means for outputting order items in which the identifier is provided for each product other than the element products according to the purchase-requested product data. As a result, there is provided a function in which the individual products and the group of products are uniformly managed.

A product sales apparatus according to a preferred embodiment of the present invention includes means for associating element products with one another and preparing a product presentation data for each group of products, based on a product list including specific products as products which are sold as the individual products or the element products included in the group of products; means for prompting selection of a product by presenting the product presentation data; means for receiving a purchase-requested product data in which the element products have a unique identifier provided for each of the group of products; and means for updating an order status of each product based on the purchase-requested product data. As a result, a user terminal may have a unique identifier allocated to the element product for each group of products.

The preferred embodiments of the present invention provide advantages that a unique identifier is allocated to each group of products, the specific product is managed by means of the same product code at the same time the element product is processed by associating to each group of products even if the specific product is the individual product or the element product.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 5 is a table showing an example of a product database in the preferred embodiment according to a preferred embodiment of the present invention;

FIG. 6 is a table showing another example of the product database in the preferred embodiment according to a preferred embodiment of the present invention;

FIG. 7 is a table showing an example of the other product database in the preferred embodiment according to a preferred embodiment of the present invention;

FIG. 8 indicates an example of a product selection screen in the preferred embodiment according to a preferred embodiment of the present invention;

FIG. 9 is an example of data representation stored in a purchase product recording section in the preferred embodiment according to a preferred embodiment of the present invention;

FIG. 10 is a table showing an example of a purchase-requested product data outputted from the user terminal in the preferred embodiment according to a preferred embodiment of the present invention;

FIG. 11 indicates an example of a product confirmation screen in the preferred embodiment according to a preferred embodiment of the present invention;

FIG. 12 indicates an example of a purchase form in the preferred embodiment according to a preferred embodiment of the present invention;

DESCRIPTION OF THE PREFERRED EMBODIMENTS

Preferred embodiments of the present invention will be hereafter described in detail, with reference to the accompanying drawings.

Figure 1:
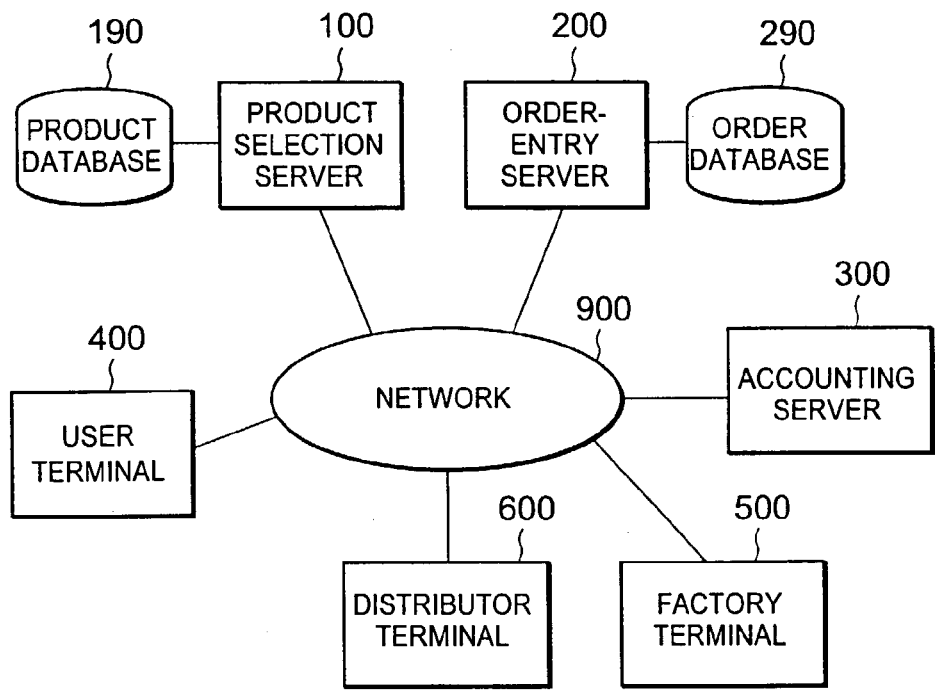
FIG. 1 is a block diagram showing a preferred embodiment of a product sales system according to a preferred embodiment of the present invention.

Referring to FIG. 1, in an embodiment of a product sales system according to the present invention, a product selection server 100 for requesting product selection, an order entry server 200 for accepting an order for a selected product, an accounting server 300 for performing accounting process with respect to the order, a user terminal 400 by which a product purchaser purchases a product, a factory terminal 500 installed in a factory, and a distribution terminal 600 installed in a distribution center are connected through a network 900. Further, a product database 190 is connected to the product selection database 200 and the order entry server 200 is connected to an order database 290.

Based on a product list stored in the product database 190, the product selection server 100 associates element products with one another for each group of products and presents to the user terminal 400 with the element products as a product presentation data so as to prompts a product purchaser to select a product. The product selected by the product purchaser is received by the product selection server 100 as a purchase-requested product data. The product selection server 100 outputs the purchase-requested product data to the order entry server 200 via the network 900.

The order entry server 200 verifies whether contents of the purchase-requested product data received from the product selection server 100 satisfy conditions as a group of products. Further, the order entry server 200 verifies the order database 290 so as to see whether the purchase-requested or selected product is in inventory or not. The order entry server 200 displays a list of purchase products at the user terminal 400 so as to ask the product purchaser for confirmation of the intention of the order. Upon confirmation of the intention, the order entry server 200 updates the order database 290 and performs order processing.

The accounting server 300 pays for an item for which the order entry server 200 has performed the order processing.

The user terminal 400 receives input of product selection from the product purchaser and prepares the purchase-requested product data. When the selected product is a specific product as an element product of a group of products, a purchase group number is allocated to each group of products for the element product. The user terminal 400 outputs the prepared purchase-requested product data to the product selection server 100 via the network 900.

The factory terminal 500 and the distribution terminal 600 issue an order form according to an order data held in the order database 290. The order form includes the purchase group number allocated by the user terminal 400.

Figure 2:
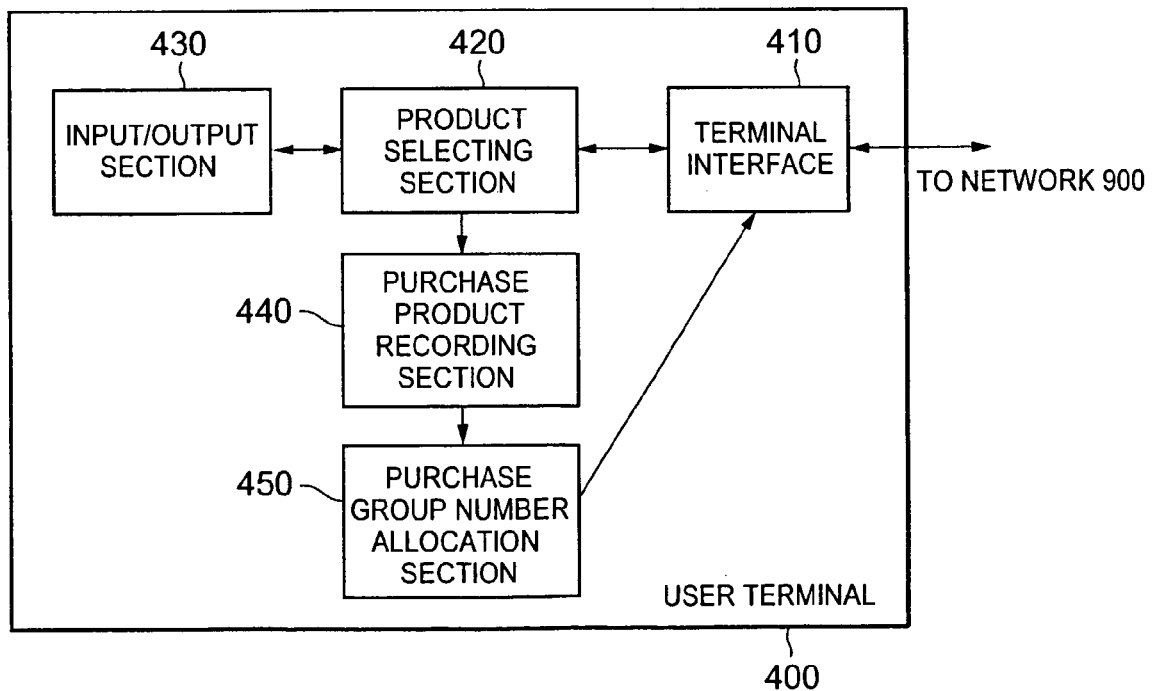
FIG. 2 is a block diagram showing functions of a user terminal in the preferred embodiment according to a preferred embodiment of the present invention.

Referring to FIG. 2, the user terminal 400 includes a terminal interface 410 connected to the network 900, an input/output section 430 for realizing man-machine interface with the product purchaser, a product selecting section 420 for selecting a product desired by the product purchaser, an purchase product recording section 440 for recording the selected product, and a purchase group number allocation section 450 for allocating the purchase group number to the selected product.

The terminal interface 410 receives search condition for the product from the input/output section 430 through the product selecting section 420, and outputs the search condition to the product selection server 100 through the network 900. The terminal interface 410 also receives the product presentation data from the product selection server 100 through the network 900, and outputs the product presentation data to the input/output section 430 through the product selecting section 420. Further, the terminal interface 410 receives the purchase-requested product data from the purchase group number allocation section 450, and outputs the purchase-requested product data to the product selection server 100 via the network 900.

The product selecting section 420 receives the product presentation data from the terminal interface 410 and outputs the product presentation data to the input/output section 430. Further, the product selecting section 420 outputs the product selection data to the purchase product recording section 440 according to input from the input/output section 430.

The input/output section 430 includes, for example, a display for displaying data and a keyboard or a mouse for inputting the data. Using the input/output section 430, the product purchaser inputs the search condition of a product to be purchased so as to display the product. Further, the product purchaser inputs data of the purchase desired product and a quantity thereof by means of the input/output section 430.

The purchase product recording section 440 records the product selection data received from the product selecting section 420. Further, as for element products among the recorded products, the purchase product recording section 440 stores the data associating the element products with one another for those constituting a group of products.

Based on the data stored in the purchase product recording section 440, the purchase group number allocation section 450 allocates a purchase group number to each product so as to output the purchase group number as the purchase-requested product data to the terminal interface 410.

Figure 3:
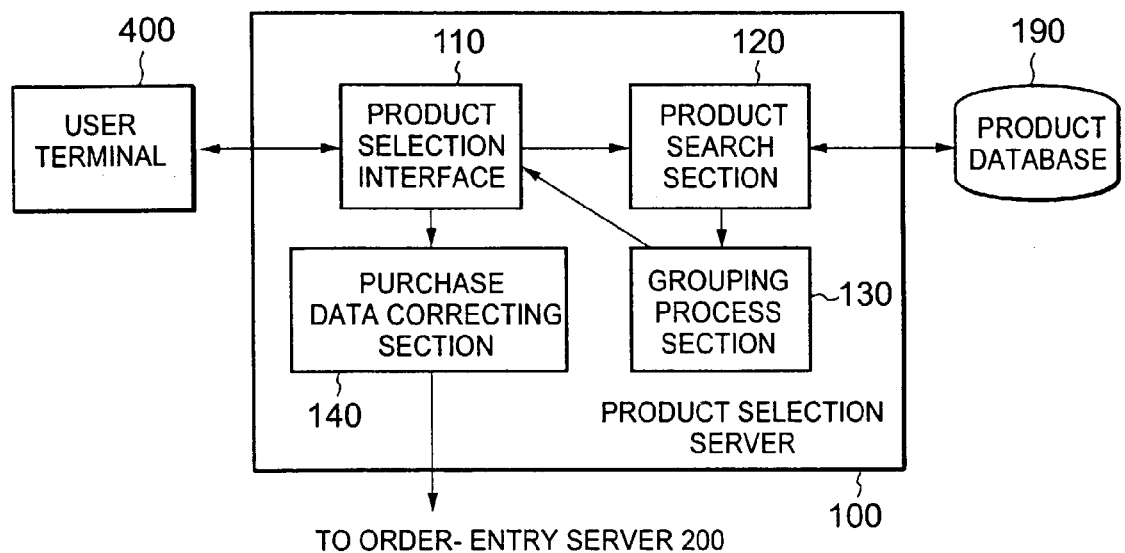
FIG. 3 is a block diagram showing functions of a product selection server in the preferred embodiment according to a preferred embodiment of the present invention.

Referring now to FIG. 3, the product selection server 100 includes a product selection interface 110 realizing interface with the user terminal 400, a product search section 120 for searching a predetermined product, a grouping process section 130 for associating an element product to a group of products with respect to the searched product, and a purchase data correcting section 140 for replacing the purchase group number with respect to the purchase-requested product data from the user terminal 400.

The product selection interface 110 receives the search condition with respect to the product from the user terminal 400 and outputs the search condition to the product search section 120. The product selection interface 110 also receives the product presentation data from the grouping process section 130 and outputs the product presentation data to the user terminal 400. Further, the product selection interface 110 receives the purchase-requested product data from the user terminal 400 and outputs the purchase-requested product data to the purchase data correcting section 140.

The product search section 120 receives the search condition with respect to the product from the product selection interface 110 and searches the product from the product database 190 according to the search condition. The product search section 120 outputs the searched data to the grouping process section 130.

With respect to the data searched by the product search section 120, the grouping process section 130 associates the element products with one another for those included in the same group of products so as to prepare the product presentation data. For example, the element products included in the same group of products are arranged to have consecutive addresses. The association determines whether a specific product is defined as an individual product or an element product. The associated data is outputted as a product presentation data to the product selection interface 110.

The purchase data correcting section 140 performs a correction process such that the purchase-requested product data from the user terminal 400 may be in a format allowed by the order entry server 200. For example, if the purchase group numbers are interrupted or discrete because of cancellation of part of products on the user terminal 400 side, the purchase group numbers are changed to be consecutive in ascending order or descending order. The purchase data correcting section 140 outputs the thus processed purchase-requested product data to the order entry server 200 via the network 900.

Figure 4:
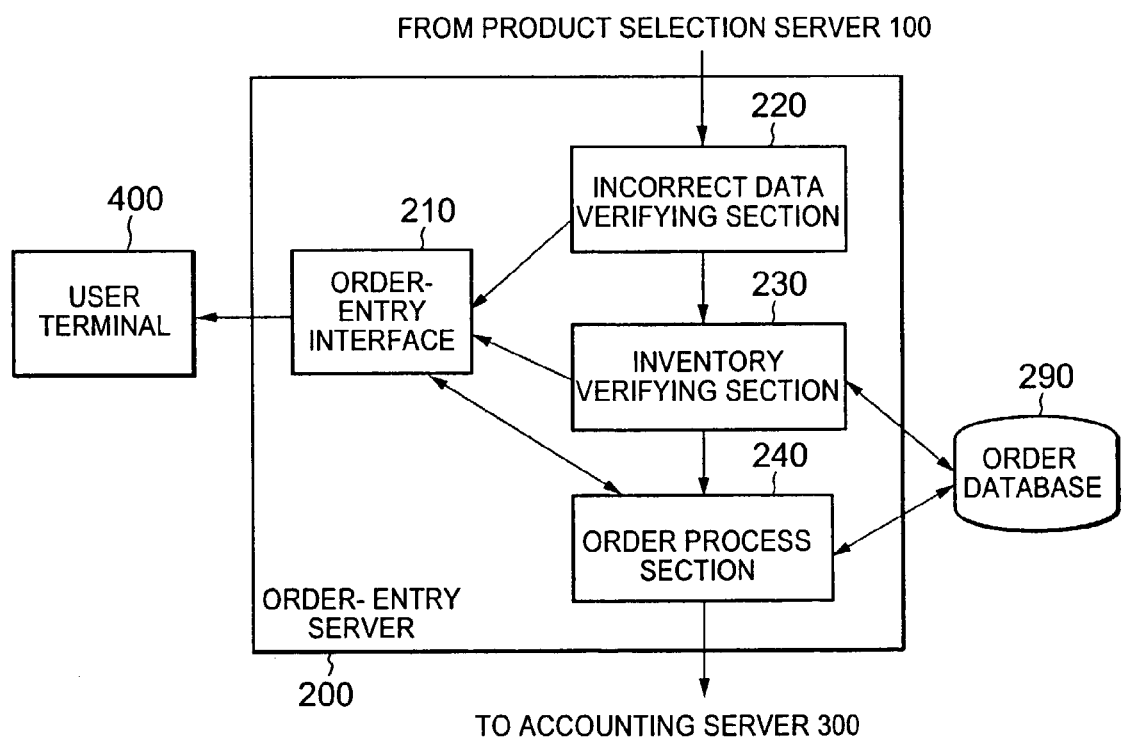
FIG. 4 is a block diagram showing functions of an order entry server in the preferred embodiment according to a preferred embodiment of the present invention.

Referring to FIG. 4, the order entry server 200 includes an order entry interface 210 for realizing an interface with the user terminal 400, an incorrect data verifying section 220 for verifying the contents of the purchase-requested product data from the product selection server 100, a inventory verifying section 230 for verifying an inventory of a product included in the purchase-requested product data, and an order process section 240 for determining a product to be ordered and performing its order process.

The incorrect data verifying section 220 verifies whether the purchase-requested product data from the product selection server 100 is that matches a predetermined condition. For example, when we specify that at most one hard disk drive which is an element product may be used in a computer set which is a group of products, if only one computer main body and two hard disk drives are purchased, the data are considered to be incorrect and the user terminal 400 is informed of the incorrectness via the order entry interface 210. In this example, if one hard disk drive as the element product and another hard disk drive as the individual product are purchased at the same time, data thereof is correct. Such verification is particularly useful if a discount is available when a product is purchased as an element product of a group of products. If a discount of headphones is given in a sales campaign provided that a portable audio device combined with the headphones are purchased, purchase of one portable audio device with one set of headphones may receive benefits of the sales campaign prices and purchase of an additional second set of headphones may not receive the benefits.

The inventory verifying section 230 retrieves, from the order database 290, the purchase-requested product data from which any incorrect data has not been detected by the incorrect data verifying section 220 and verifies whether each of the purchase-requested products is in inventory. If a product is found to be out of inventory, the inventory verifying section 230 informs the user terminal 400 of the fact via the order entry interface 210. Upon confirming that all products are in inventory, the inventory verifying section 230 asks the order process section 240 to perform an order process.

The order process section 240 presents a list of products to be ordered at the user terminal 400 via the order entry interface 210 so as to prompt the user to confirm. When the confirmation of the purchase order is inputted from the user terminal 400, the confirmed product is reserved based on the purchase-requested product data and the order database 290 is updated. Further, the order process section 240 outputs the ordered items to the accounting server 300 via the network 900.

The order entry interface 210 sends information from the incorrect data verifying section 220 and the inventory verifying section 230 to the user terminal 400. Further, the order entry interface 210 sends an order confirmation request from the order entry section 240 to the user terminal 400 and transmits an order confirmation received from the user terminal 400 to the order process section 240.

Now, a construction of the product database 190 according to a preferred embodiment of the present invention will be described as follows.

Referring to FIG. 5, in an example of the product database 190 there are provided a product code 191, a product name 192, a main body flag 193 indicating that the product is a main body of a group of products, a group product code 194 which is a product code of an element product constituting a group of products when the product is the main body of the group of products, a price indication flag 195 for indicating that a single product price is indicated even when the product is indicated as an element product, the single product price 196 which is a price when a single product is sold as an individual product, and a price in group 197 which is a price when the product is integrated into a group of products as an element product. It should be understood that a product price means either the single product price 196 or the price in group 197.

As to the example as indicated in FIG. 5, in the group of products in which a computer A (CPA) that is a main body carries a main body flag 193 being ON ("1"), and the group product code 194 indicates that element products are the computer A, a memory (MM), a hard disk drive (HD), a display (DP) and a CDR drive (CD). Similarly, in a group of products in which a computer B is a main body it can be seen that element products are the computer B and the memory, the hard disk drive, and the display too. Further, it can be seen that a price indication flag 195 of the display is ON ("1") so that a price in group 197 is indicated even when it is indicated as an element product of a group of products. As to the display it can be seen that the price in group 197 is less expensive than the single product price 196 so that a discount price as a group of products is provided.

Referring now to FIGS. 6 and 7, there is indicated another example of the product database 190 in which the group product code 194 in the example as indicated in FIG. 5 is separated as an additional table. In other words, the example as indicated in FIG. 6 is equivalent to the example of FIG. 5 from which the group product code 194 is deleted. The group product code 194 is maintained in the additional table as indicated in FIG. 7. The table as indicated in FIG. 7 also maintains a set code 198 which is a product code as a group of products and a set name 199 which is a name of the group of products. Since the set code 198 of FIG. 7 is associated to the product code of the main body, FIG. 6 may be searched to specify the product code of the main body and find a group product code 194 by referring to the table of FIG. 7.

Now, an example of a product selection screen on the user terminal 400 will be described as follows, according to a preferred embodiment of the present invention.

Referring to FIG. 8, in the example of the product selection screen there are indicated product names 401, purchase quantity input boxes 402, a sub-total 403, and a screen changing button 404.

As to product names 401, a main body, a memory, a hard disk drive, a display, and a CDR drive which are element products of a computer A (a group of products) are indented so as to be recognized at a glance that they are of the group of products. Computer B that is a group of products is indicated and recognized in a similar manner. In order to indicate them as groups of products, the grouping process section 130 (see FIG. 3) of the product selection server 100 associates the element products with one another. Further, the memory, the hard disk drive, the display, and the CDR drive are also additionally indicated as individual products. A flexible disk drive as indicated in FIG. 8 does not belong to a group of products and therefore is only indicated as an individual product.

The product purchaser uses the input/output section 430 of the user terminal 400 and inputs desired quantities respectively into purchase quantity input boxes 402. For example, if the memory is purchased, the product purchaser may clearly express his or her intention to expand memories in the computer A, to expand memories in the computer B, or to purchase a memory unit without expansion.

The sub-total 403 displays an amount of money corresponding to the input into the purchase quantity input boxes 402. Upon completion of the input into the purchase quantity input boxes 402, the product purchaser pushes the screen changing button 404, then the input into the purchase quantity input boxes 402 is held in a virtual shopping basket.

The product selection process is realized by the product selecting section 420 (see FIG. 2) of the user terminal 400. The contents in the virtual shopping basket is held in the purchase product recording section 440 (see FIG. 2).

Now, an example for realizing a purchase group number allocation on the user terminal 400 according to the preferred embodiment of the present invention will be described as follows.

Referring to FIG. 9, the purchase product recording section 440 (see FIG. 2) of the user terminal 400 holds the contents of the purchase quantity input boxes 402 (see FIG. 8) in an area starting with an address of 4000, for example, as a product data area 441. Starting with an address of 8000, a group product management area 442 for representing an area of groups of products may be held. This example indicates that the first group of products is held in addresses from 4000 to 4004 and the second group of products is held in addresses from 4005 to 4008. The content in an address 8002 is a null pointer that indicates that there is no further group of products.

According to such data structures, the purchase group number allocation section 450 (see FIG. 2) of the user terminal 400 allocates a purchase group number to each of the purchased products. As for the above example, at first referring to the product data area 441 successively from the address 4000 to the address 400D, a product whose purchase quantity is one or more than one and the purchase quantity are extracted. By referring to the group product management area 442 starting with the address 8000, a location of the group of product in the product data area is specified to generate a purchase group number.

Referring to FIG. 10, an example of the purchase-requested product data outputted from the user terminal 400 to the product selection server 100 includes a product code 411, a purchase quantity 412, a purchase group number 413, and a main body flag 414. The purchase quantity 412 is inputted into the purchase quantity input boxes 402 (see FIG. 8) by the product purchaser and in this example a product whose purchase quantity is less than one is excluded from the purchase-requested product data. The purchase group number 413 is allocated by the purchase group number allocation section 450 (see FIG. 2). In this example, the main body (CPA), the memory (MM), the hard disk drive (HD), and the display (DP) which are element products of the computer A (a group of products) are provided with "1" as a purchase group number. Further, a main body (CPB), a memory (MM), and a display (DP) which are element products of the computer B (a group of products) are provided with "2" as a purchase group number.

A memory (MM) as an individual product is provided with "3" as a purchase group number, and a flexible disk drive (FD) is provided with "4" as a purchase group number. An individual product without a purchase group number does not affect associating element products of a group of products with one another, it is not necessary to allocate a purchase group number to the individual product. However, if a purchase group number is allocated to an individual product there is an advantage that the individual product and a group of products may be consolidated.

In this example, the purchase group numbers are consecutive, however, when instructions to cancel part of the purchase products are provided in a step of selecting a product, the purchase group number may be interrupted or discrete. If it is the case, the purchase data correcting section 140 (see FIG. 3) of the product selection server 100 renumbers the purchase group numbers to be consecutive. This process is carried out for corresponding to a format acceptable on the order entry server 200 except that the order entry server 200 does not particularly require the process.

Now, an example will be described as follows for a product confirmation screen on the user terminal 400 according to a preferred embodiment of the present invention.

Referring to FIG. 11 in the example of the product confirmation screen after selecting a product there are indicated product names 421, unit prices of products 422, product quantities 423, product sub-totals 424 which are amounts of products, and target delivery dates 425. In this example a quantity 423, a product sub-total 424, and a target delivery date 425 are indicated for each group of products or for each individual product.

A unit price 422 is indicated for each group of products or each individual product in principle. For example, with respect to a CTO (Configuration-To-Order) product in which components for a device are combined according to the product purchaser's wish, if it is not desired to indicate a price of each component, it is possible to indicate only a price of the CTO product as a whole. On the other hand the example of FIG. 11 indicates the unit prices for displays even if they are of element products among a group of products, which is controlled by the price indication flags 195 (see FIG. 5 and FIG. 6). Thus, if it is desired to indicate the prices of the element products in order to emphasize the discount prices as indicated on the display, all that required is that corresponding price indication flags 195 be turned ON. On the other hand, the corresponding price indication flags 195 may only be turned OFF, so as not to display the unit prices for the displays as element products belonging to the group of products.

Further, in the example of the purchase confirmation screen as indicated in FIG. 11, a tax charge 427 and a tax included total 428 are displayed in addition to a tax excluded total 426. The product purchaser may change the quantity 423 on the screen. When changed, the total 426, the tax charge 427, and the total 428 are updated and displayed accordingly. Since the target delivery dates 425 are displayed, the product purchaser may finely adjust product selection according to his or her own convenience.

Upon determination of the final purchase of products, the product purchaser pushes an order button 429, whereby a purchase amount is settled. On the other hand, if the product purchaser wants to retry the product selection basically, a return button 420 may be pushed, to then move to the product selection screen of FIG. 8, for example.

Now, an output example of a purchase form at the factory terminal 500 and the distribution terminal 600 according to a preferred embodiment of the present invention will be described as follows.

With reference to FIG. 12, the output example of the purchase form indicates product codes 501, product names 502, amount of purchase 503, and purchase group numbers 504. Since the main body, the memory, the hard disk drive are provided with the same purchase group number "1" as the element products of the computer A on the factory side, the main body of the computer A hase additional memory and hard disk drive. Similarly, since the main body and the memory are provided with the same purchase group number "2" as element products of the computer B, the main body of the computer B has additional memory for expansion. Two memories other than those provided memories for expansion are provided with a purchase group number different from those of main bodies of computers A and B, and therefore are not provided for the main body. Thus, the factory side may refer to a purchase group number in order to determine whether it is necessary to assemble a device.

On the distribution center side, since the main body and the display are allocated the same purchase group number "1" as the element products of the computer A, the main body of the computer A (in which the memory and the hard disk drive have been provided) and the display are arranged to be shipped together. Similarly, since the main body and the display are allocated the same purchase group number "2" as the element products of the computer B, the main body of the computer B (in which the memory has been provided for expansion) and the display are arranged to be shipped together. Thus, the distribution center side may refer to the purchase group number in order to determine a delivery of products and a combination when arranging the delivery of products.

Now, an operational example of the user terminal 400 in the preferred embodiment according to the present invention will be described as follows.

Figure 13:
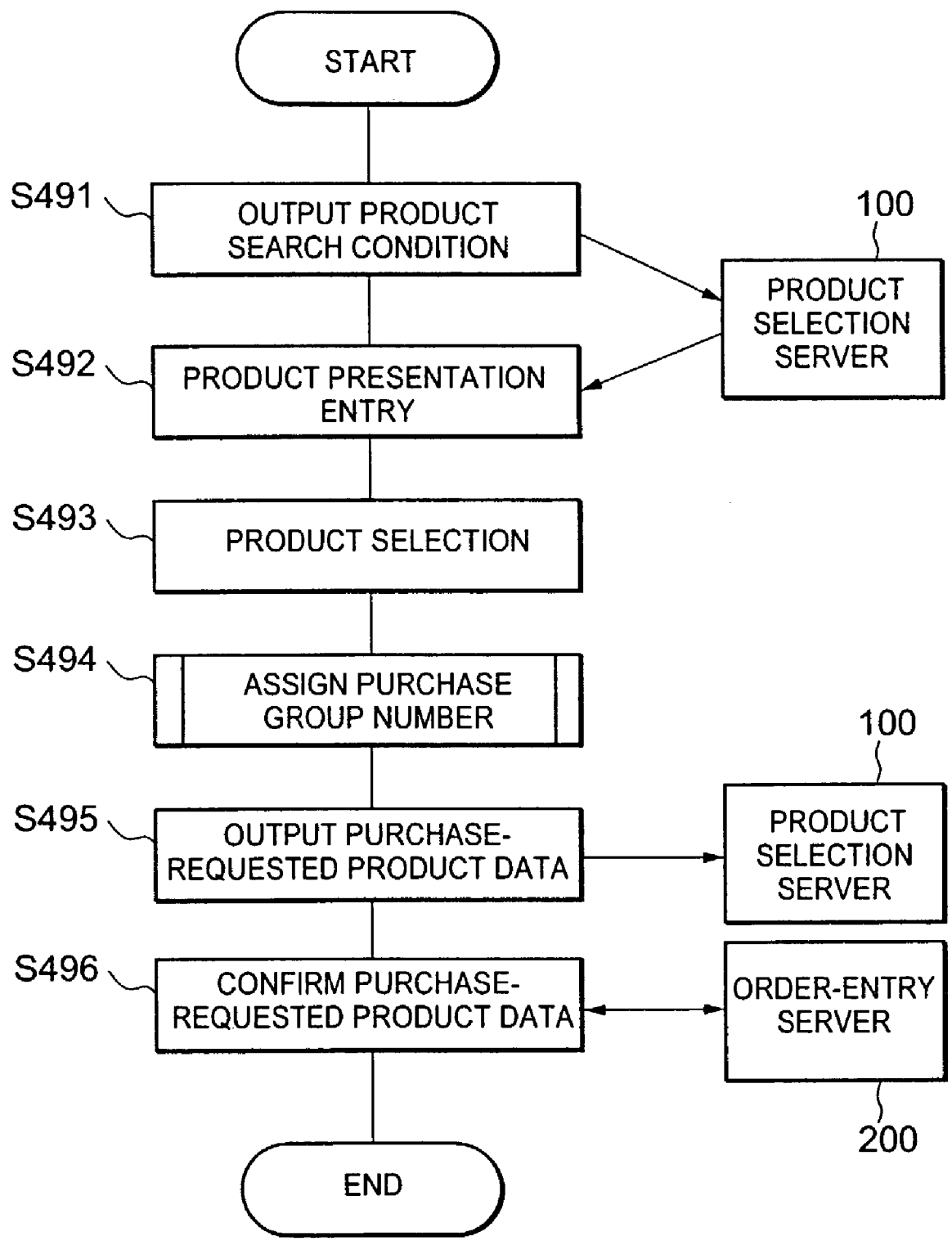
FIG. 13 is a flow chart showing an operation of the user terminal in the preferred embodiment according to a preferred embodiment of the present invention.

With reference to FIG. 2 and FIG. 13, upon receiving search condition of a product inputted by the product purchaser through the input/output section 430, the terminal interface 410 outputs the search condition of the product to the product selection server 100 (step S491). Upon receiving a product presentation data as a result of a search from the product selection server 100 (step S492), the terminal interface 410 prompts the product purchaser to select a product by means of the input/output section 430 via the product selecting section 420. Upon receiving a product selection input of the product purchaser, the product selecting section 420 outputs the input as the product selection data to the purchase product recording section 440 (step S493). The purchase product recording section 440 stores the product selection data outputted from the product selecting section 420 as indicated in FIG. 9, for example. Based on the product selection data stored in the purchase product recording section 440, the purchase group number allocation section 450 allocates (assigns) a purchase group number (step S494). The data provided with the purchase group number in this way is outputted as a purchase-requested product data from the terminal interface 410 to the product selection server 100 (step S495). Subsequently, when the order entry server 200 prompts confirmation of the purchase products, the product purchaser confirms the purchase products through the input/output section 430.

Figure 14:
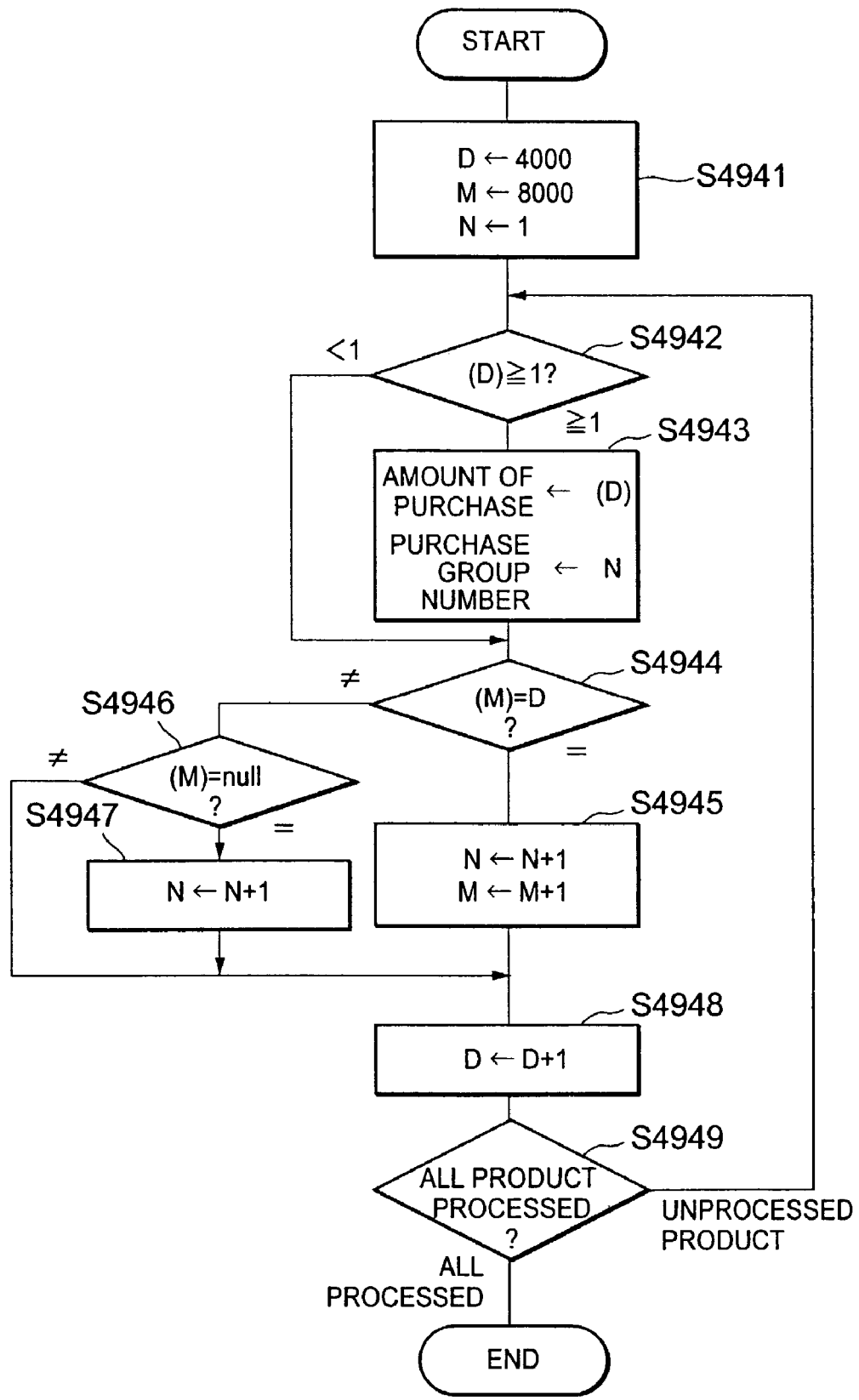
FIG. 14 is a flow chart showing an operation of a purchase group number allocating process of the user terminal in the preferred embodiment according to a preferred embodiment of the present invention.

Referring to FIG. 9 and FIG. 14, there is indicated a more detailed operational example of the purchase group number allocation process (step S494) in the purchase group number allocation section 450 (see FIG. 2). In step S4941, parameters employed in the process are initialized, at first. A parameter D indicates an address in the product data area 441 or indicates the starting address "4000" as an initial value. A parameter M indicates an address in the group product management area 442 or indicates the starting address "8000" as an initial value. A parameter N holds the purchase group number or holds "1" as an initial value. Each parameter notation in parentheses is intended to refer to contents of data stored in an area of an address indicated by the parameter. For example, when a value of the parameter D is "4000", (D) represents the contents in the address 4000 ("1" as indicated in the example of FIG. 9).

Firstly, the contents in the product data area 441 are read by means of the parameter D and it is determined whether the contents are equal to 1 or larger (step S4942). When the contents are equal to 1 or larger, the product is target for purchase, thus the contents of the product data area 441 are used as the amount of purchase and the contents of the parameter N are used as the purchase group number (step S4943).

Secondly, the contents in the group product management area 442 are read by means of the parameter M and it is determined whether the contents are equal to the contents of the parameter D (step S4944). When the contents are equal, the product is the last element product of the group of products, thus the parameters N and M are each incremented by one for the next process so as to indicate a next group of products (step S4945). On the other hand, when the contents in the group product management area 442 are null pointers indicating an invalid address (step S4946), it means that there is no further group of products, so that the parameter N is incremented by one to advance the purchase group number to the next (step S4947).

In addition, upon indicating the next data in the product data area 441 by incrementing the parameter D by one (step S4948), it is determined whether all products have been processed (step S4949). If there is an unprocessed product, a similar process is repeated starting with step S4942. In this way, a purchase group number is allocated to each purchase product.

Now, an operational example of the product selection server 100 according to a preferred embodiment of the present invention will be described below.

Figure 15:
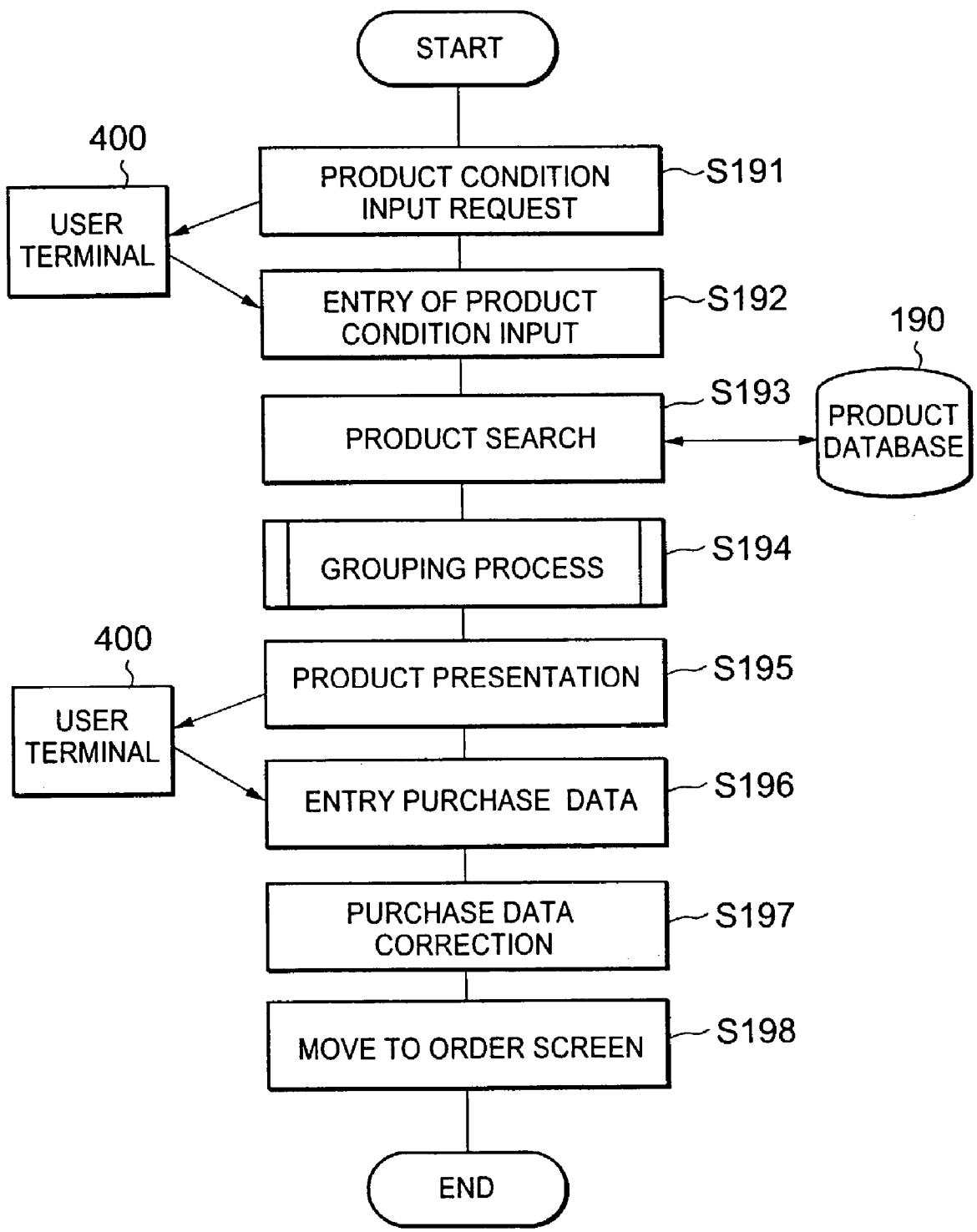
FIG. 15 is a flow chart showing an operation of the product selection server in the preferred embodiment according to a preferred embodiment of the present invention.

With reference to FIG. 3 and FIG. 15, through the product selection interface 110, the product selection server 100 prompts the user terminal 400 to input product search condition (step S191) and receives the product search condition input from the user terminal 400 responding to the prompt (step S192). The product search section 120 searches the product database 190 according to the product search condition received from the user terminal 400 (step S193). Thus, the data as indicated in examples of FIG. 5 or FIG. 6 and FIG. 7 may be obtained from the product database 190.

Based on the search result, the grouping process section 130 groups specific products into individual products and element products of a group of products (step S194), then presents the data related to the grouped products to the user terminal 400 through the product selection interface 110 (step S195). When the product selection interface 110 receives the purchase-requested product data from the user terminal 400 (step S196), the purchase data correcting section 140 performs a correction process such that the purchase-requested product data from the user terminal 400 may be in a format allowed by the order entry server 200 (step S197). For example, as a result of the above-mentioned confirmation of the purchase products, if the purchase group numbers are interrupted or discrete because of cancellation of part of products on the user terminal 400 side, the purchase group numbers are changed to be consecutive in ascending order or descending order. Upon completion of these processes, the purchase data correcting section 140 outputs the purchase-requested product data to the order entry server 200, and the screen on the user terminal 400 moves to an order screen (step S198).

Figure 16:
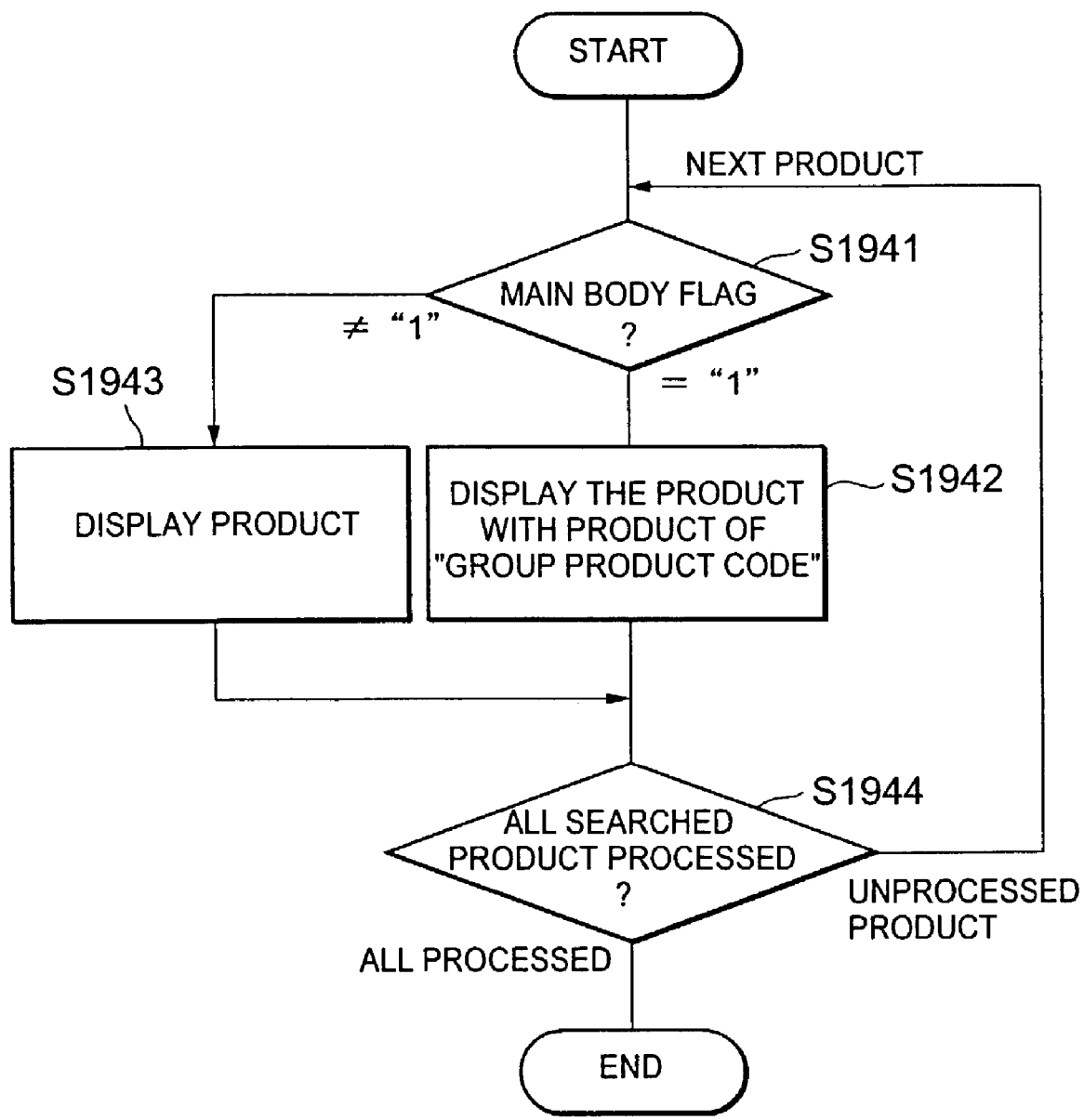
FIG. 16 is a flow chart showing an operation of a grouping process of the product selection server in the preferred embodiment according to a preferred embodiment of the present invention.

Referring to FIG. 3 and FIG. 16, there is indicated a more detailed operational example of a grouping process (step S194) in the grouping process section 130 which successively reads products in the data as indicated in FIG. 5, for example, and then verifies a status of the main body flag 193 of each product (step S1941). It can be seen that the product is a main body in a group of products, when the main body flag 193 is ON ("1"), so that at first the product is outputted to the product presentation data and the product code 191 is searched by means of the product code included in the group product codes 194 as a key and outputs corresponding product together with the main body to the product presentation data (step S1942). In the example of FIG. 5, for instance, the computer A is outputted as the main body, subsequently the memory (MM), the hard disk drive (HD), the display (DP), and the CDR drive (CD) are outputted in order.

At this event, it is necessary to record which products constitute a group of products with respect to the outputted product as the product presentation data. For example, if a method of recording an address of the last product in the group of products as indicated in FIG. 9 is employed, the address having recorded the data of the last product included in the group product code 194 is maintained.

If the main body flag 193 is OFF (≠"1") as a result of verifying the status of the main body flag 193 in step S1941, it can be seen that the product is an individual product, so that the product is independently outputted to the product presentation data (step S1943).

A similar process is applied to all products, successively. Upon completion of the process for all products (step S1944), the grouping process is ended.

Now, an operational example of the order entry server 200 according to a preferred embodiment of the present invention will be described as follows.

Figure 17:
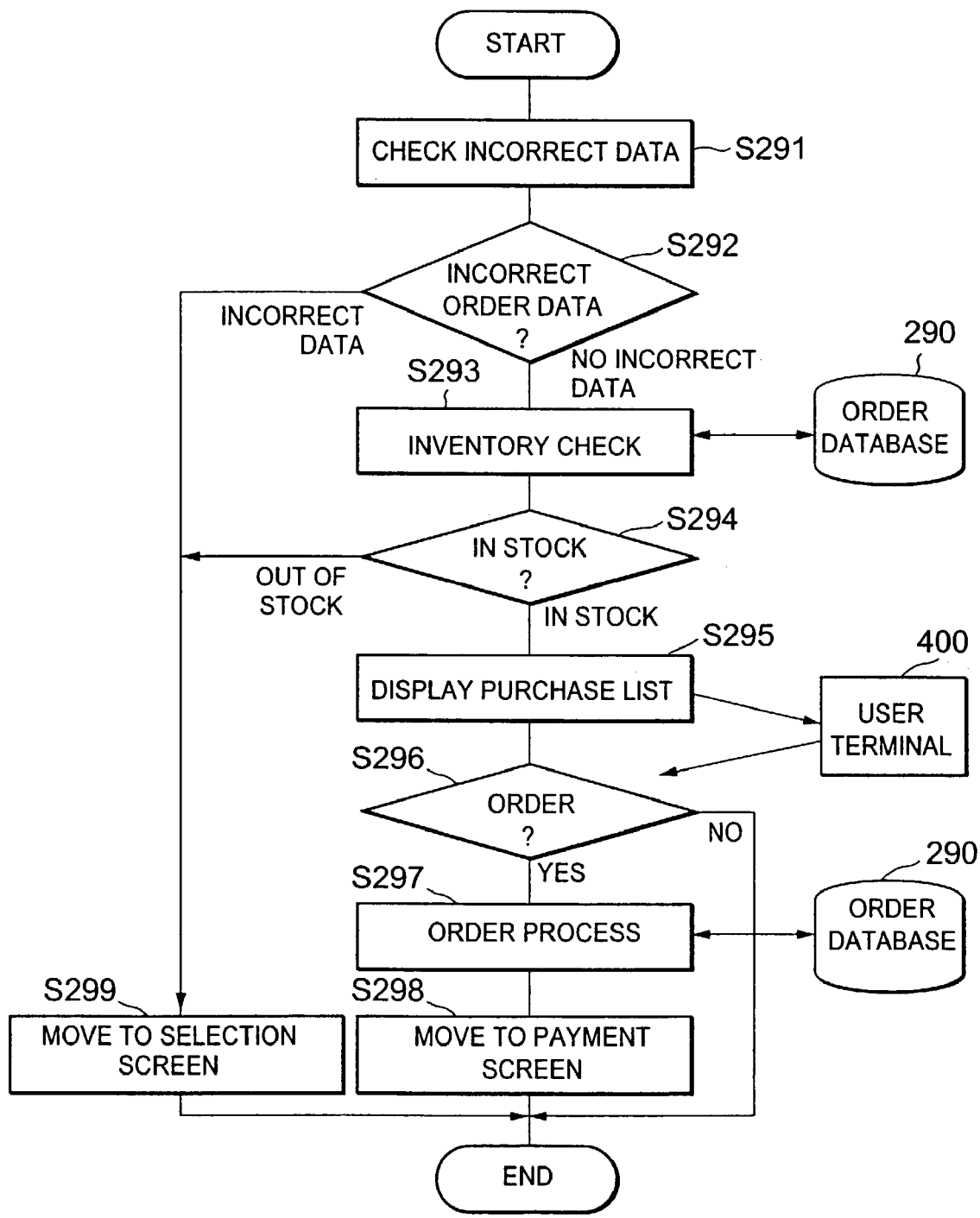
FIG. 17 is a flow chart showing an operation of the order entry server in the preferred embodiment according to a preferred embodiment of the present invention.

With reference to FIG. 4 and FIG. 17, in the order entry server 200, the incorrect data verifying section 220 verifies whether the purchase-requested product data received from the product selection server 100 is that matches a predetermined condition (step S291). For example, when at most one hard disk drive which is an element product may be used in a computer set which is a group of products, even though only one computer main body is purchased, if two hard disk drives are purchased, the data are considered to be incorrect (step S292) and the screen moves to the selection screen in order to prompt the product purchaser to select a product again (step S299).

If the purchase-requested product data has no incorrect data, the inventory verifying section 230 searches, from the order database 290, so as to verify whether each of the purchase-requested products is in inventory or not (step S293). If a product is found to be out of inventory (step S294), the screen moves to the selection screen in order to prompt the product purchaser to select a product again (step S299).

Upon confirming that all products are in inventory, the order process section 240 presents a list of products to be ordered to the user terminal 400 so as to prompt confirmation of the products (step S295). Responding to this, when the product purchaser pushes the order button 429 as indicated in FIG. 11 (step S296), the order process section 240 reserves the confirmed product based on the purchase-requested product data and updates the order database 290 (step S297). The order process determines an amount of payment and moves to a payment screen by means of the accounting server 300 (step S298). On the other hand, as a result of prompting confirmation of products in step S295, if the product purchaser cancels the purchase, the process is ended without executing the payment.

According to the preferred embodiments of the present invention, when the purchase-requested product data is outputted from the user terminal 400 to the product selection server 100, the purchase group number is allocated so as to determine which products belong to a group of products when shipping the products or assembling an apparatus. When price indication of the element products in the group of products is not desirable, only an overall price of the group products may be indicated. Further, as for the purchase-requested product data from the product selection server 100, an incorrect data may be detected through a relationship between an amount of purchase of the main body of the group of products and an amount of purchase (purchase quantity) of other element products.

It should be noted that in the present specification, the steps of describing the processes, either executed electronically by computer or other means, not only includes the processes which are carried out in time sequence along the order described herein, but may also include processes which are executed in parallel or individually, and not processed in time sequence.

Furthermore, it should be pointed out that the present invention is not limited to the above-mentioned preferred embodiments and may be applied to other embodiments. It is therefore to be understood by those of ordinary skill in the art that any changes, variations, combinations and sub-combinations may be practiced otherwise than as specifically described herein without departing from the scope and spirit of the present invention.

For example, according to the preferred embodiments of the present invention, the product selection server 100, the order entry server 200 and the accounting server 300 have been described as being independent of one another, however, the present invention is not limited thereto, these elements may be realized as an integrated product sales apparatus.

According to the preferred embodiments of the present invention, the element products have been described as being allocated the purchase group number for each group of product, however the present invention is not limited thereto, thus a peculiar or unique identifier may be provided for each group of products, and the identifier may be any combination of characters including any kind of alphabet, ideograms, numerals, signs, symbols and the like.

According to the preferred embodiments of the present invention as described above, as an example of association between element products, it has been described that element products included in the same group of products are disposed to have consecutive addresses, however the present invention is not limited thereto, so the element products may be combined by a pointer-like a list or be provided with a unique identifier for each group of products.

What is claimed is:

1. A method by computer for requesting selection of a product comprising:

associating element products with one another and preparing presentation data for each group of products, based on a product list including specific products as products which are sold as individual products and as said element products included in said group of products, said associating including associating each product and associated element product having a same product number;

storing in a memory group product codes each of which is a product code of an element product constituting a group of products;

prompting selection of a product by presenting said product presentation data; searching said memory for other associated elements of a particular group product code when a search request is received for a first element associated with said particular group product code;

receiving a purchase-requested product data in which said element products are assigned a purchase group number for all elements of said group of products; and displaying an indication of the other associated elements, wherein said associating includes referencing a first memory section and a second memory section, said first memory section includes a first address that holds a pointer to an address in said second memory section indicating that a content of said address in said second memory section represents a last product in a group of products identified in successive addresses in said second memory section, and said second memory section holding address locations of the elements of said group of products to which said purchase group number is assigned.

2. The method according to claim 1, wherein said prompting selection of the product presents said specific products as said element products included in said group of products or as said individual products.

3. The method according to claim 2, wherein:

said product list comprises product prices of each product; and said prompting selection of the product indicates said product prices when presenting said specific products as said individual products and does not indicate said product prices when presenting said specific products as said element products included in said group of product.

4. The method according to claim 2, wherein:

said product list includes product prices of respective products and comprises a price indication flag for each of said products for instructing whether to indicate said product prices when presented as said element products included in said group of products; and said prompting selection of the product indicates said product prices when presenting said specific products as said individual products, and does not indicate said product prices if said instruction means does not instruct to indicate said product prices or indicates said product prices if said instruction means instructs to indicate said product prices when presenting said specific products as said element products included in said group of products.

5. The method according to claim 2, wherein:

said product list comprises single product prices when respective specific products are treated as said individual products and prices within the group when said specific products are treated as said element products included in said group of products; and said prompting selection of the product calculates said single product prices of said specific products when presenting said specific products as said individual products and calculates said prices within the group of said specific products when presenting said specific products as said element products included in said group of products to then display a total amount.

6. The method according to claim 1, further comprising:

searching a product from said product list that matches a search condition, wherein said associating associates said element products with one another for each of said group of products according to the product searched through said searching.

7. The method according to claim 1, wherein:

said unique identifier allocated to each of said group of products comprises a character; and the method further comprises performing a correction process for making said identifier match a condition for said received purchase-requested product data.

8. A product selection server comprising:

means for associating element products with one another and preparing a product presentation data for each group of products, based on a product list including specific products as products which are sold as individual products and as said element products included in said group of products, said means for associating including means for associating each product and associated element product having a same product number;

a memory having stored therein group product codes each of which is a product code of an element product constituting a group of products;

means for prompting selection of a product by presenting said product presentation data;

means for searching said memory for other associated elements of a particular group product code when a search request is received for a first element associated with said particular group product code;

means for receiving a purchase-requested product data in which said element products are assigned a purchase group number for all elements of said group of products; and a display for displaying an indication of the other associated elements, wherein said means for associating includes a first memory section and a second memory section, said first memory section includes a first address that holds a pointer to an address in said second memory section indicating that a content of said address in said second memory section represents a last product in a group of products identified in successive addresses in said second memory section, and said second memory section holding address locations of the elements of said group of products to which said purchase group number is assigned.

9. The product selection server according to claim 8, wherein said means for prompting selection of the product presents said specific products as said element products included in said group of products or as said individual products.

10. The product selection server according to claim 9, wherein:

said product list comprises product prices of each product; and said means for prompting selection of the product indicates said product prices when presenting said specific products as said individual products and does not indicate said product prices when presenting said specific products as said element products included in said group of products.

11. The product selection server according to claim 9, wherein:
said product list includes product prices of respective products and comprises an instruction means for each of said products for instructing whether to indicate said product prices when presented as said element products included in said group of products; and
said means for prompting selection of the product indicates said product prices when presenting said specific products as said individual products, and does not indicate said product prices if said instruction means does not instruct to indicate said product prices or indicates said product prices if said instruction means instructs to indicate said product prices when presenting said specific products as said element products included in said group of products.

12. The product selection server according to claim 9, wherein:
said product list comprises single product prices when respective specific products are treated as said individual products and prices within the group when said specific products are treated as said element products included in said group of products; and
said means for prompting selection of the product calculates said single product prices of said specific products when presenting said specific products as said individual products and calculates said prices within the group of said specific products when presenting said specific products as said element products included in said group of products to then display a total amount.

13. The product selection server according to claim 8, further comprising:
means for searching a product from said product list that matches a search condition, wherein
said means for associating associates said element products with one another for each of said group of products according to the product searched by said means for searching.

14. The product selection server according to claim 8, wherein:
said unique identifier allocated to each of said group of products comprises a character; and
said product selection server further comprises means for performing a correction process for making said identifier of said received purchase-requested product data match a condition.

15. A computer-readable recording medium having recorded therein a program for causing a computer to execute:
associating element products with one another and preparing a product presentation data for each group of products, based on a product list including specific products as products which are sold as said individual products and as said element products included in said group of products, said associating including associating each product and associated element product having a same product number;
storing in a memory group product codes each of which is a product code of an element product constituting a group of products;
prompting selection of a product by presenting said product presentation data;
searching said memory for other associated elements of a particular group product code when a search request is received for a first element associated with said particular group product code;
receiving a purchase-requested product data in which said element products are assigned a purchase group number for all elements of said group of products; and
displaying an indication of the other associated elements,
wherein said associating includes referencing a first memory section and a second memory section,
said first memory section includes a first address that holds a pointer to an address in said second memory section indicating that a content of the address in the second memory section represents a last product in a group of products identified in successive addresses in the second memory section, and
said second memory section holding address locations of the elements of said group of products to which said purchase group number is assigned.

16. The method by computer for selecting a product, comprising:
receiving product presentation data including specific products sold as individual products and as element products included in a group of products, recognizing each product and associated element product having a same product number;
storing in a memory group product codes each of which is a product code of an element product constituting a group of products;
selecting a product for purchase from said product presentation data;
searching said memory for other associated elements of a particular group product code when a search request is received for a first element associated with said particular group product code;
assigning said element products with a purchase group number for all elements of said group of products when said selected product corresponds to said specific product and is selected as said element product of said group of products;
outputting purchase-requested product data including said identifier; and
displaying an indication of the other associated elements,
wherein said storing includes using a first memory section and a second memory section,
said first memory section includes a first address that holds a pointer to an address in said second memory section indicating that a content of said address in said second memory section represents a last product in a group of products identified in successive addresses in said second memory section, and
said second memory section holding address locations of the elements of said group of products to which said purchase group number is assigned.

17. The method according to claim 16, further comprising:
allocating said identifier to each of said individual products if said selected product corresponds to said individual products.

18. A computer-readable recording medium having recorded therein a program for causing a computer to execute:
receiving product presentation data including specific products sold as individual products and as element products included in a group of products, recognizing each product and associated element product having a same product number;
storing in a memory group product codes each of which is a product code of an element product constituting a group of products;
selecting a product for purchase from said product presentation data;

searching said memory for other associated elements of a particular group product code when a search request is received for a first element associated with said particular group product code;
receiving a purchase-requested product data in which said element products are assigned a purchase group number for all elements of said group of products;
outputting purchase-requested product data including said identifier; and
displaying an indication of the other associated elements,
wherein said storing includes using a first memory section and a second memory section,
said first memory section includes a first address that holds a pointer to an address in said second memory section indicating that a content of said address in said second memory section represents a last product in a group of products identified in successive addresses in said second memory section, and
said second memory section holding address locations of the elements of said group of products to which said purchase group number is assigned.

19. The computer-readable recording medium according to claim 18, further having recorded therein a program for causing the computer to execute allocating said identifier to each of said individual products if said selected product corresponds to said individual products.

20. A product sales apparatus comprising:
means for associating element products with one another and preparing a product presentation data for each group of products, based on a product list including specific products as products which are sold as individual products and as said element products included in said group of products, said means for associating including means for associating each product and associated element product having a same product number;
a memory configured to store group product codes each of which is product code of an element product constituting a group of products;
means for prompting selection of a product by presenting said product presentation data;
means for searching said memory for other associated elements of a particular group product code when a search request is received for a first element associated with said particular group product code;
means for receiving a purchase-requested product data in which said element products are assigned a purchase group number for all elements of said group of products;
means for updating an order status of each product based on said purchase-requested product data; and
a display configured to display an indication of the other associated elements,
wherein said memory includes a first memory section and a second memory section,
said first memory section includes a first address that holds a pointer to an address in said second memory section indicating that a content of said address in said second memory section represents a last product in a group of products identified in successive addresses in said second memory section, and
said second memory section holding address locations of the elements of said group of products to which said purchase group number is assigned.

21. A product sales apparatus comprising:
a grouping process section for associating element products with one another for each of a group of products and preparing a product presentation data, based on a product list including specific products as products sold as individual products and as said element products included in said group of products, said grouping process section including a grouping mechanism configured to associate each product and associated element product having a same product number;
a product selection interface for presenting said product presentation data and prompting selection of a products;
an order entry interface for receiving a purchase-requested product data in which said element products have a unique identifier provided for each of said group of products;
an order process section for updating an order status of each product based on said purchase-requested product data;
a memory having stored therein group product codes each of which is a product code of an element product constituting a group of products such that when a search request is received for a first element associated with a particular group product code, the memory assigns to other associated elements of said particular group product code a purchase group number; and
a display configured to display the first element with the other associated elements,
wherein said grouping mechanism includes a first memory section and a second memory section,
said first memory section includes a first address that holds a pointer to an address in said second memory section indicating that a content of said address in said second memory section represents a last product in a group of products identified in successive addresses in said second memory section, and
said second memory section holding address locations of the elements of said group of products to which said purchase group number is assigned.

22. A product sales method comprising:
associating element products with one another for each of a group of products and preparing a product presentation data, based on a product list including specific products as products sold as individual products and as said element products included in said group of products, said associating including associating each product and associated element product having a same product number;
presenting said product presentation data and prompting selection of a products;
receiving a purchase-requested product data in which said element products are-assigned a purchase group number for all elements of said group of products;
updating an order status of each product based on said purchase-requested product data;
storing in a memory a group of product codes each of which is a product code of an element product constituting a group of products in response to receiving a search request for a first element associated with a particular group product code;
searching said memory for other associated elements of said particular group product code; and
displaying an indication of the other associated elements,
wherein said associating includes referencing a first memory section and a second memory section,
said first memory section includes a first address that holds a pointer to an address in said second memory section indicating that a content of said address in said second memory section represents a last product in a group of products identified in successive addresses in said second memory section, and said second memory section holding address locations of the elements of said group of products to which said purchase group is assigned.

23. A computer-readable recording medium having recorded thereon a program for causing a computer to execute a method, comprising:

associating element products with one another for each of a group of products and preparing a product presentation data, based on a product list including specific products as products sold as individual products and as said element products included in said group of products, said associating including associating each product and associated element product having a same product number;

presenting said product presentation data and prompting selection of a product;

receiving a purchase-requested product data in which said element products are assigned a purchase group number for all elements of said group of products;

updating an order status of each product based on said purchase-requested product data;

storing in a memory a group of product codes each of which is a product code of an element product constituting a group of products in response to receiving a search request for a first element associated with a particular group product code;

searching the memory for other associated elements of said particular group product code; and displaying an indication of the other associated elements, wherein said associating includes referencing a first memory section and a second memory section, said first memory section includes a first address that holds a pointer to an address in said second memory section indicating that a content of said address in said second memory section represents a last product in a group of products identified in successive addresses in said second memory section, and said second memory section holding address locations of the elements of said group of products to which said purchase group number is-assigned.

\* \* \* \* \*